KLYSTRON AMPLIFIER EMPLOYING HELICAL DISTRIBUTED FIELD BUNCHER RESONATORS AND A COUPLED CAVITY EXTENDED INTERACTION OUTPUT RESONATOR

Filed Dec. 5, 1966 3 Sheets-Sheet 1

INVENTORS
ERLING L. LIEN
WILLIAM J. LEIDIGH
BY Robert K. Dilts
ATTORNEY

Dec. 9, 1969 E. L. LIEN ET AL 3,483,420

KLYSTRON AMPLIFIER EMPLOYING HELICAL DISTRIBUTED FIELD BUNCHER RESONATORS AND A COUPLED CAVITY EXTENDED INTERACTION OUTPUT RESONATOR

Filed Dec. 5, 1966 3 Sheets-Sheet 2

INVENTORS
ERLING L. LIEN
WILLIAM J. LEIDIGH
BY Robert W. Dietz
ATTORNEY

INVENTORS
ERLING L. LIEN
WILLIAM J. LEIDIGH
BY Robert W. Dilts
ATTORNEY

United States Patent Office 3,483,420

Patented Dec. 9, 1969

3,483,420

KLYSTRON AMPLIFIER EMPLOYING HELICAL DISTRIBUTED FIELD BUNCHER RESONATORS AND A COUPLED CAVITY EXTENDED INTERACTION OUTPUT RESONATOR

Erling L. Lien, Los Alto, and William I. Leidigh, Belmont, Calif., assignors to Varian Associates, Palo Alto, Calif., a corporation of California Filed Dec. 5, 1966, Ser. No. 599,105
Int. Cl. H01j 25/10
U.S. Cl. 315—5.39 8 Claims

ABSTRACT OF THE DISCLOSURE

The present invention relates in general to klystron amplifiers and, more particularly, to an improved klystron amplifier employing helical distributed field buncher resonators and a coupled cavity extended interaction output resonator, whereby improved efficiency and bandwidth are obtained at relatively high power levels. Such improved klystron tubes are specially useful for, but not limited in use, to portable microwave transmitters such as, for example, those used for interplanetary spaceborne communication.

Figures 1, 6:
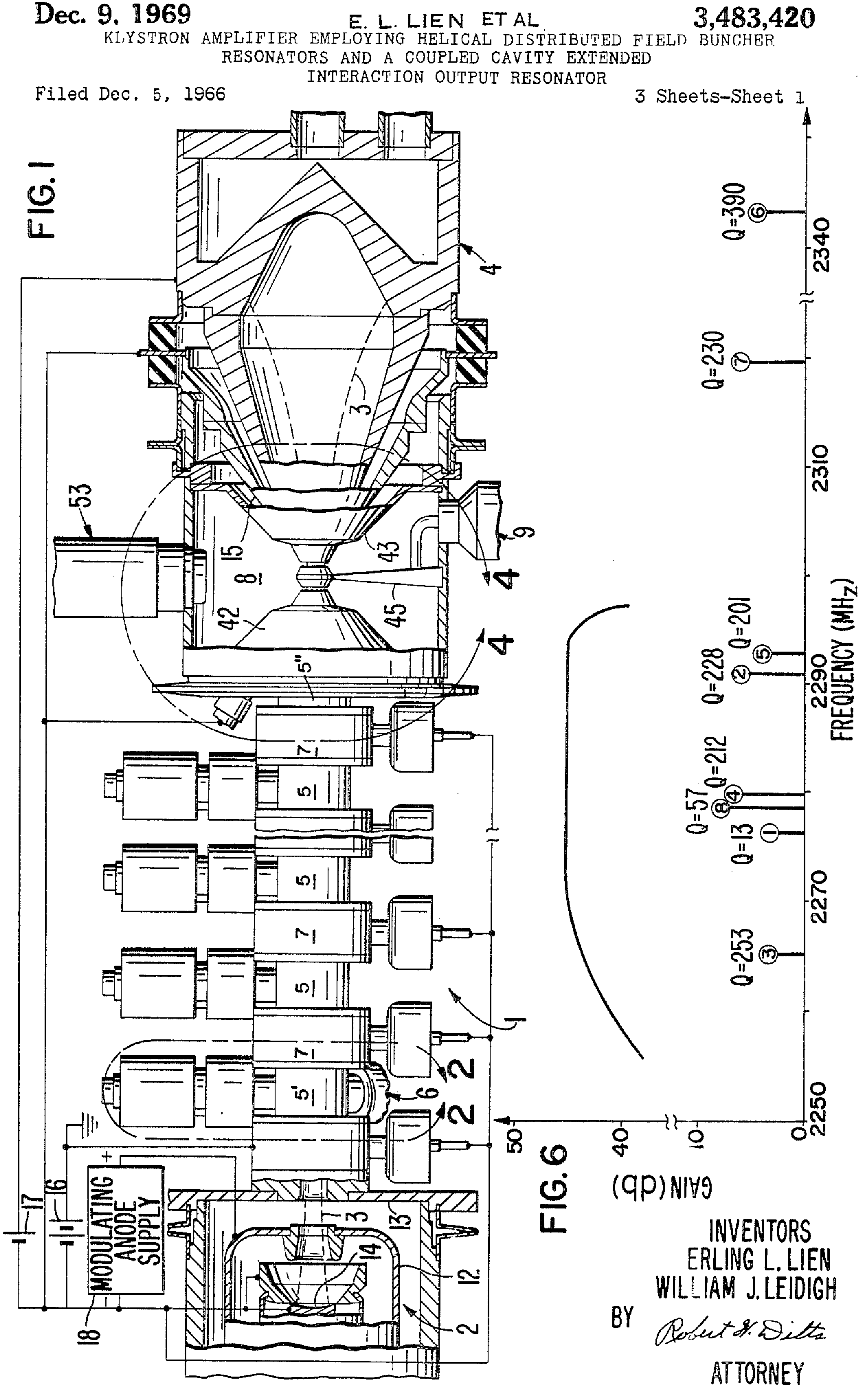

The invention described herein was made in the performance of work under a NASA contract and is subject to the provisions of Section 305 of the National Aeronautics and Space Act of 1958, Public Law 85-568 (72 Stat. 435; 42 U.S.C. 2457).

Heretofore, klystron amplifiers have been proposed wherein distributed field helical resonators were employed as the buncher resonators in combination with a reentrant cavity resonator serving as the output or catcher cavity. Such a tube is described and claimed in U.S. Patent 2,945,-155, issued July 12, 1960, and assigned to the same assignee as the present invention.

The problem with such a prior art tube is that in order to take advantage of the relatively large bandwidth obtainable by use of the distributed field resonator, the output resonator must be very heavily loaded. However, when the output cavity is heavily loaded to obtain broadband operation its Q is reduced to such a point that its efficiency is substantially impaired, thereby reducing the overall efficiency of the klystron amplifier to a point which is unacceptable for many applications.

It has been proposed in the aforecited patent to employ a helical distributed field resonator as the output resonator. While such a combination will yield a relatively wide band tube the unloaded Q of the helical distributed field resonator is not sufficiently high to prevent substantial circuit losses in the distributed field resonator. Such losses in the output resonator produce heating of the distributed field resonator, thereby limiting the power output to unacceptably low levels.

In the present invention, a klystron amplifier tube is provided which employs a plurality of helical distributed field resonators as the buncher resonators followed by a coupled cavity extended interaction resonator as the catcher or output resonator, whereby relatively wide band output is obtained at relatively high power levels. In a preferred embodiment of the present invention, the extended interaction coupled cavity resonator is formed with a conical end wall structure to facilitate electrostatic focusing of the beam, whereby the size and weight of the tube are reduced as compared to magnetically focused tubes. An S-band klystron amplifier of the present invention has provided in excess of 100 watts output with a bandwidth of 35 mHz. and an efficiency of 36%, when employed with a depressed beam collector.

The principal object of the present invention is the provision of an improved klystron amplifier.

One feature of the present invention is the provision of a klystron amplifier employing distributed field helical buncher resonators followed by a coupled cavity extended interaction output resonator, whereby relatively wideband output is obtained at relatively high efficiencies and moderate power levels.

Another feature of the present invention is the same as the preceding feature wherein the extended interaction output resonator is a two-gap coupled cavity resonator resonant in the $\pi$ mode, whereby an efficient relatively wideband output circuit is obtained and whereby, in an electrostatically focused tube, an additional focusing lens is not required between the two interaction gaps of the output resonator.

Another feature of the present invention is the same as any one or more of the preceding features wherein the upstream end wall of the coupled cavity resonator has a cone shape and reentrantly projects into the coupled cavity resonator to accommodate an electrostatic beam focusing lens, whereby the distance from the center of the penultimate resonator to the center of the coupled cavity output resonator is relatively short for optimum efficiency while accommodating the electrostatic beam focus lens therebetween.

Another feature of the present invention is the same as any one or more of the preceding features wherein one or more of the distributed field helical buncher resonators are formed by a single helix or topologically equivalent helix shorted at its ends to the side walls of an enclosing conductive chamber and supported from the side walls of the chamber by means of refractory dielectric rods extending axially of the chamber and helix, whereby a relatively small diameter and rugged buncher resonator is obtained.

Figure 3:
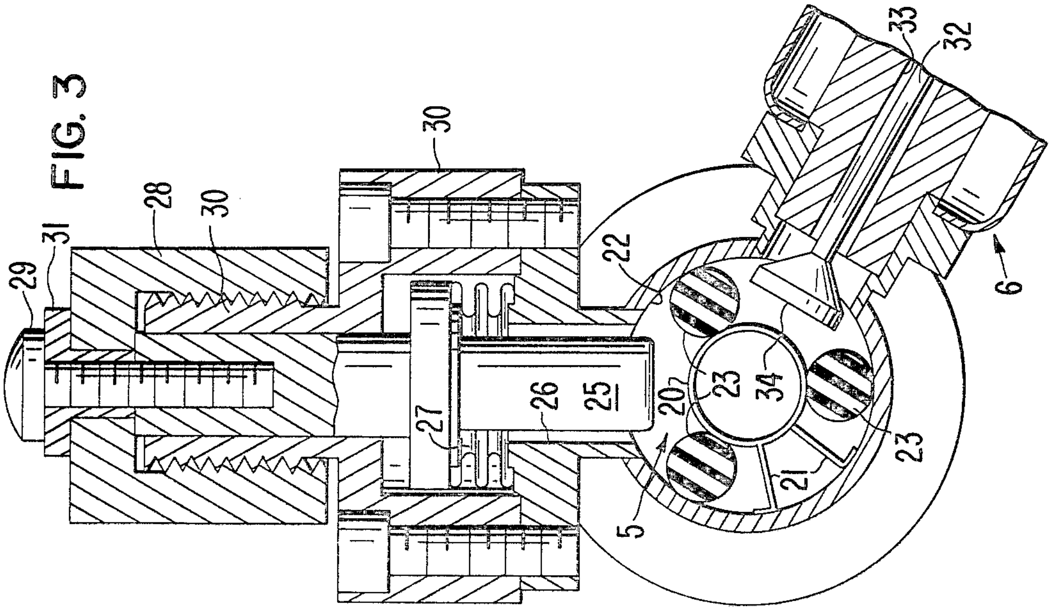
Figure 2:
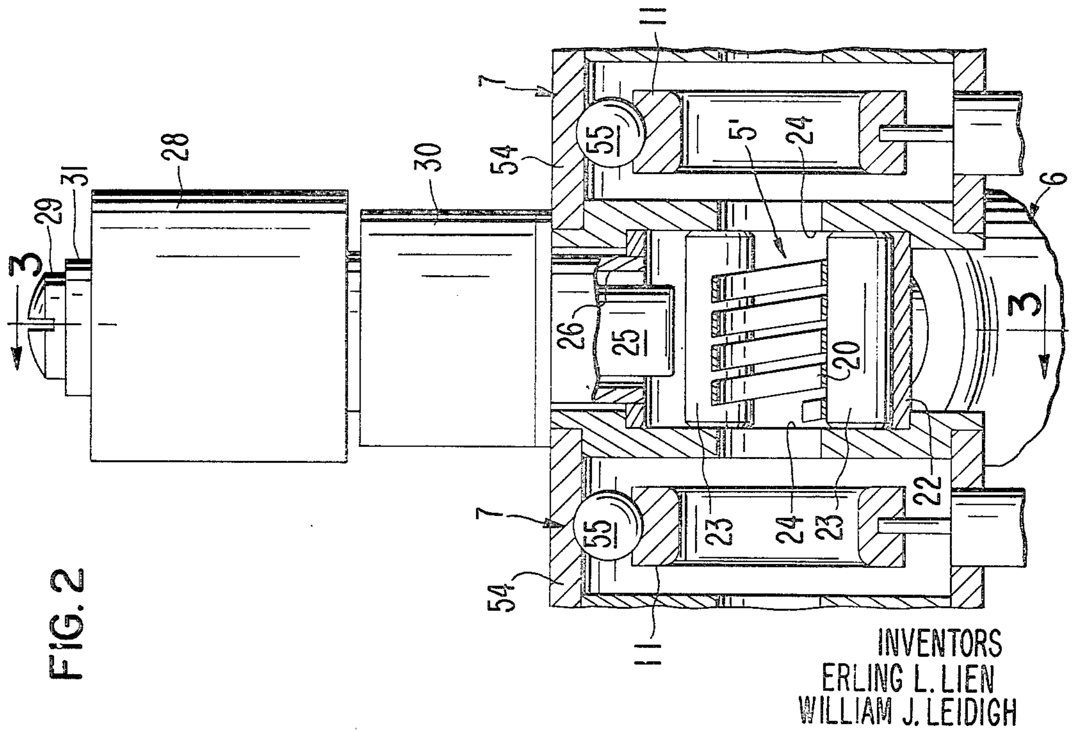
Figure 5:
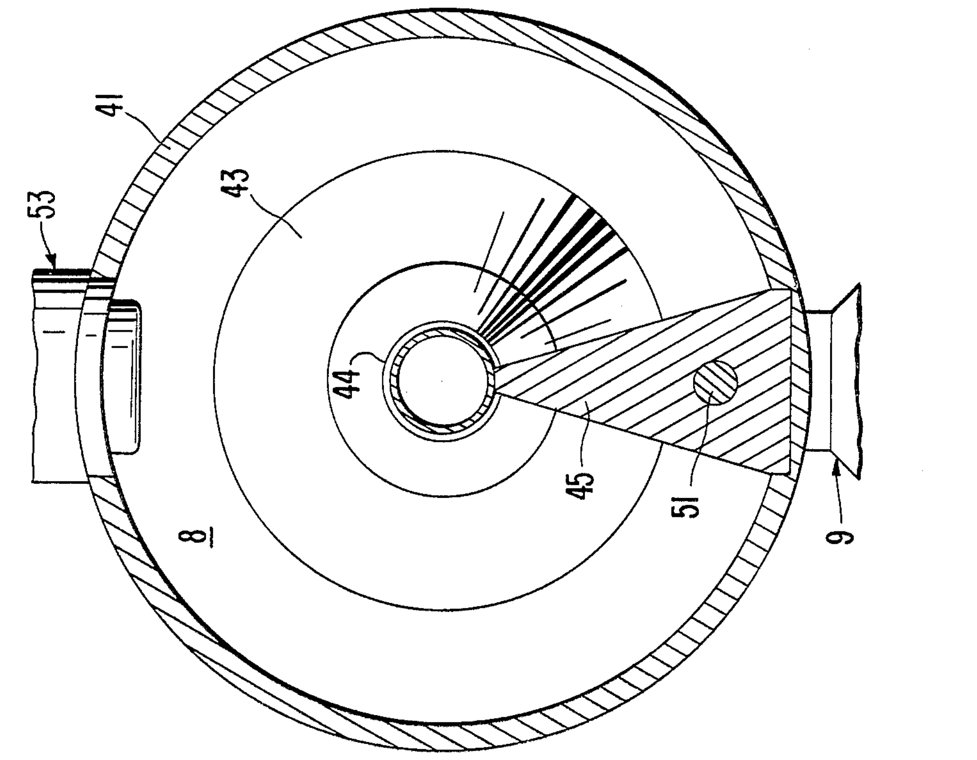
Figure 4:
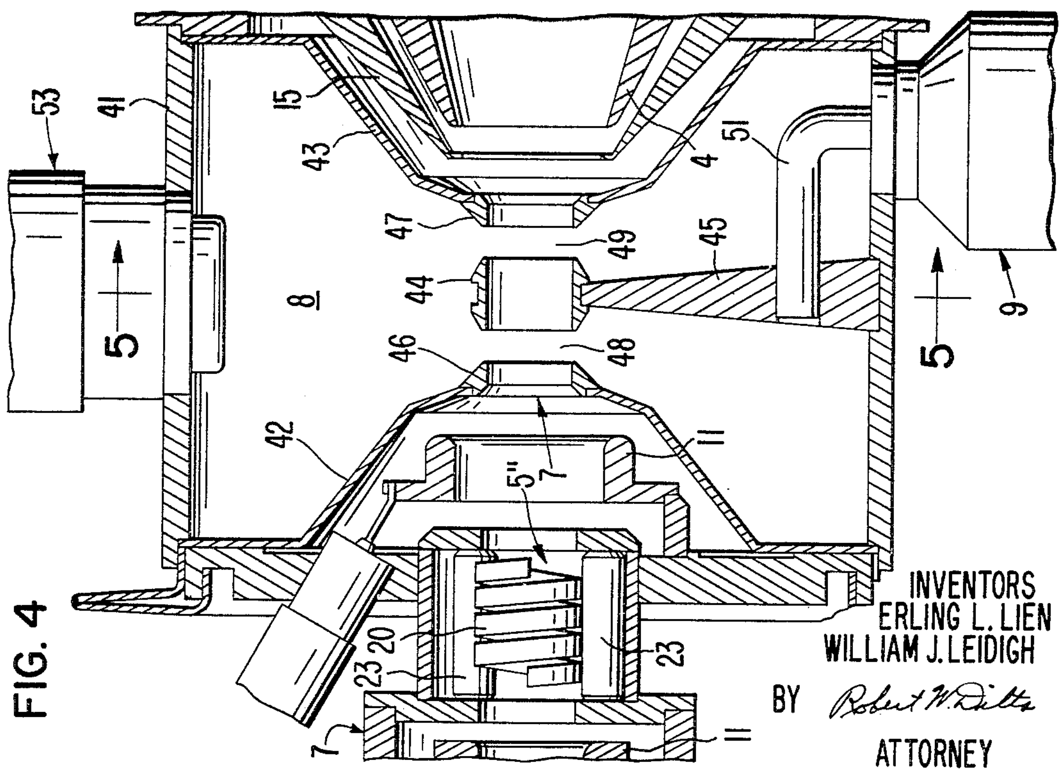

Other features and advantages of the present invention will become apparent upon a perusal of the following specification taken in connection with the accompanying drawings wherein:

FIGURE 1 is a foreshortened longitudinal view, partly in section and partly schematic of a klystron amplifier incorporating features of the present invention, FIGURE 2 is an enlarged sectional view of a portion of the structure of FIGURE 1 delineated by line 2—2, FIGURE 3 is a sectional view of the structure of FIGURE 2 taken along line 3—3 in the direction of the arrows, FIGURE 4 is an enlarged sectional view of a portion of the structure of FIGURE 1 delineated by line 4—4, FIGURE 5 is a sectional view of the structure of FIGURE 4 taken along line 5—5 in the direction of the arrows.

FIGURE 6 is a plot of gain in db versus frequency in mHz. for a tube of the present invention.

Referring now to FIGURE 1 there is shown a klystron amplifier 1 of the present invention. The amplifier 1 includes an electron gun assembly 2 for forming and projecting a beam of electrons over an elongated predetermined beam path 3 to a beam collector structure 4 disposed at the terminal end of the beam path 3. The beam collector structure 4 collects and dissipates the energy of the beam.

A plurality of helical distributed field buncher resonator structures 5 are successively spaced apart along the beam path 3 for successive electromagnetic interaction with the beam. A first one of the buncher resonators 5′ includes a coaxial radio frequency, R.F., input connector 6 for exciting the resonator 5′ with signal wave energy to be amplified. The electric fields of the resonator 5′ velocity modulate the beam. The velocity modulation imparted to the beam is transformed into current density modulation (bunching) of the beam in the R.F. field-free drift spaces 7 between successive resonators 5. The bunched beam which passes through successive resonators 5 excites these resonators 5 at the signal frequency. The resonant fields serve to further velocity modulate and, thus, further bunch the beam as it traverses successive buncher resonators 5.

A coupled cavity extended interaction resonator 8 is disposed on the beam path 3 between the penultimate resonator 5'' and the collector structure 4 for extracting the amplified signal wave energy from the beam. A coaxial output coupler 9 is coupled to the output resonator 8 for coupling the output signal energy to a suitable utilization device such as an antenna, not shown.

A plurality of electrostatic beam focusing lenses 11 are disposed along the beam path 3 for focusing the beam through the interaction circuit formed by the resonators 5 and 8. A modulating anode structure 12 is disposed between the main anode 13 and the cathode emitter 14 of the electron gun assembly 2 for modulating the beam current and, thus, the R.F. power output of the amplifier tube 1. A suppressor electrode 15 is located at the mouth of the collector 4 for suppressing electron emission from the collector 4.

A main power supply 16 supplies a negative potential as of −3 kv. to the cathode 14 relative to the grounded anode 13, thereby producing a beam voltage of 3 kv. The electrostatic beam focusing lenses 11 and the suppressor electrode 15 are operated at cathode potential. A separate power supply 17 supplies a potential which is about 60% of the anode potential to the collector structure 4 such that depressed collector operation is obtained for enhanced efficiency. A third power supply 18 which may be modulated is connected between the cathode 14 and modulating anode 12.

Referring now to FIGURES 2 and 3 the distributed field resonators 5 are shown in greater detail. The resonators 5 comprise a metallic tape helix 20 as, for example, copper-plated molybdenum connected at its ends via conductive legs 21 to a surrounding conductive barrel structure 22, as of copper-plated molybdenum, forming a portion of the vacuum envelope of the tube 1. Three axially-directed dielectric support rods 23, one of beryllia, and two of quartz are spaced at 120° intervals about the periphery of the helix and support the helix from the barrel structure 22. The beryllia rod serves to conduct heat from the helix to the barrel structure. The barrel structure 22 is closed at its ends by a pair of centrally apertured conductive plates 24, as of copper-plated molybdenum and the barrel simply clamps the helix in place via the rods 23.

A conductive tuning plunger 25 is axially mounted within a bore 26 radially intersecting with the barrel 22. A metallic bellows 27 is sealed between the plunger 25 and the bore 26 to permit axial translation of the tuning plunger within the bore 26 for tuning of the helix resonator 5. The outer end of the tuning plunger slides in bearing engagement with an externally threaded bearing member 30 carried from the barrel 22. A tuning nut 28 is threaded over the external threads of the bearing member 30. A screw 29 is threaded into the end of the tuning plunger 25 and connects the nut 28 to the plunger 25. A bearing member 31 is inserted in the end of the nut 28 and around the screw such that the nut 28 is freely rotatable relative to the non-rotatable tuning plunger 25. Rotation of the nut 28 causes the coupled tuning plunger to move toward and away from the helix resonator 5 for tuning thereof.

The input helix resonator 5' includes the input coaxial coupler 6. The coaxial coupler includes a center conductor 32 coaxially disposed of an outer conductor 33. The center conductor 32 includes an enlarged end portion 34 which projects slightly into the resonator 5' to serve as an antenna for capacitively coupling wave energy into the helix resonator 5'.

The helix 20, in a typical example, is four turns long and the distributed field helix resonator 5 operates at its lowest resonant frequency and is electrically half a wavelength long. Due to end effects, caused by the presence of the beam hole, the variation of the axial component of the R.F. electric field is approximately sinusoidal and one full period long. The helix 20 is, therefore, as far as beam interaction is concerned, effectively a full wavelength long. In order to minimize the variation of the beam coupling coefficient over the operating beam voltages, the helix length is adjusted to a peak-to-peak separation in the electric field corresponding to an electronic phase shift $\beta_e p = 2.5$ radians at a beam voltage of 3 kv. At the same voltage the normalized inner radius of the helix 20 is 1.13 radians. The value of the interaction impedance $(R_{sh}/Q)$ is 230 ohms and the square of the beam coupling coefficient $M^2$ is 0.58.

To obtain 35 mHz. bandwidth for the tube 1 at a center frequency of 2.3 gHz., there are seven helical distributed field buncher resonators 5 stagger-tuned over the band. Up to 100 mHz. tuning is easily realized with the tuners 25 with only a 5% decrease in $R_{sh}/Q$. The outer diameter of the helix resonators 5 is 1.4 cm. as compared with 9 cm. for a typical single-gap reentrant cavity resonator as customarily used in electrostatically focused tubes. The helix resonator 5, however, is inherently lossy and has relatively poor handling capability; therefore, it is not too well suited as an output resonator.

Referring now to FIGURES 4 and 5, there is shown the coupled cavity extended interaction output resonator structure 8 in greater detail. The resonator 8 includes a cylindrical shell 41 as of copper-clad molybdenum closed at its ends by a pair of centrally apertured conical end walls 42 and 43, as of copper-clad molybdenum reentrantly projecting into the resonator 8. A drift tube segment 44 is centrally disposed of the resonator and supported from the shell 41 by means of a radially directed conductive support arm 45 as of copper-plated molybdenum. The drift tube segment 44 is axially aligned with the central apertures in the end walls 42 and 43 for passage of the beam therethrough. Additional drift tube segments 46 and 47 are carried from the end walls 42 and 43 and project toward the center drift tube segment 44 for defining a pair of interaction gaps 48 and 49 therebetween. An inductive coupling loop 51 is connected at its inner end to the support arm 45 and forms an extension of the center conductor of the output coaxial coupler 9 for coupling the output signal from the cavity resonator 8.

The double gap, coupled cavity, extended interaction resonator 8 is dimensioned for operation on the lowest frequency resonant $\pi$ mode. More specifically, the resonator 8 is dimensioned for resonance at the operating frequency of the tube with the electric fields in the two gaps being 180° out of phase. There are at least two resonant frequencies for the resonator 8 for which the electric fields are 180° out of phase in the two gaps. However, the operating mode chosen is that one for which the resonator has the lowest resonant frequency. In this mode the resonator 8 has the highest efficiency for the desired electronic bandwidth of 35 mHz. In addition, the $\pi$ mode resonator 8 has the advantage of not requiring another beam focusing lens structure within the cavity 8 as would be required if the cavity 8 operated in the resonant mode wherein the electric fields are in phase in the two gaps.

The upstream conical end wall 42 permits the penultimate resonator 5'' to be closely spaced to the output resonator 8 while permitting the output resonator 8 to have a favorable form factor to provide a relatively high interaction impedance $(R_{sh}/Q)$ of 285 ohms. The spacing from the center of the penultimate resonator 5'' to the center of the output cavity 8 was selected as approximately 30° of plasma wavelength for optimum bunching of the beam at the output interaction gaps. The conical shaped end wall 42 permitted the final beam focusing lens 7 to be contained within the conical portion of the end wall 42.

Likewise, the downstream end wall 43 of the resonator 8 was conically-shaped to permit location of the collector entrance as close to the output interaction gaps as possible because of the rapid spread of the beam under tightly bunched conditions. In addition, the conical end wall shape permitted the suppressor electrode 15 to be placed at the entrance to the collector 4. The coupled cavity extended interaction resonator 8 had a circuit efficiency of 96.7% with an unloaded Q of 2000 to 3000. A tuning structure 53, similar to that described with regard to FIGURES 2 and 3, projects into the resonator 8 for tuning thereof.

The beam focusing lenses 11 comprise donut-shaped electrodes 11 operating at cathode potential and insulated from a surrounding vacuum-tight lens housing structure 54 by means of three spherical ceramic insulators 55 spaced at 120° intervals about the periphery of the lenses 11. Although a conventional liquid-cooled collector structure 4 is depicted, for simplicity of explanation, a radiation-cooled collector structure as described and claimed in copending U.S. application Ser. No. 577,440, filed Sept. 6, 1966, and assigned to the same assignee as that of the present invention may be employed.

In a typical example of a tube 1 according to FIGURES 1–5, the gun 2 had an area convergence of 7:1 and a perveance of 0.7 mu-perveance. The average cathode current density was approximately 200 ma./cm.$^2$ for a beam voltage of 3.2 kv. The R.F. body section was 15 cm. long containing eight resonators, seven buncher resonators 5 and an output resonator 8, together with eight beam focusing lenses 11. The tube 1 produced 100 watts microwave output over a band of 35 mHz. centered at 2300 mHz., with gain of about 40 db and efficiency of 36%, when the cavities were tuned and had loaded Q's as indicated in FIGURE 7.

Although the helical distributed field resonators have been shown and described as single helix resonators 5 other types of distributed field resonators may be employed to advantage in the tube of the present invention. Such other types of distributed field resonators include, but are not limited to, cross wound helices, topological equivalents of helices and cross wound helices, as well as other types of resonant sections of delay lines of the general type wherein the electric and magnetic fields of the circuit are largely concentrated in the immediate vicinity of the beam path. Such other delay lines include tape and wire circuits. The term "helical distributed field" is defined to include all of the distributed field resonators described in this paragraph.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A klystron amplifier including, means for forming and projecting a beam of electrons over a predetermined and elongated beam path, means at the terminal end of the beam path for collecting and dissipating the energy of the beam, means for modulating the beam with signal energy to be amplified, means forming a plurality of helical distributed field buncher resonators successively disposed along the beam path for electromagnetic interaction with the beam to successively bunch the beam at the frequency of a signal to be amplified, and means forming a coupled cavity extended interaction resonator coupled to the beam downstream of said buncher resonators for extracting amplified signal wave energy from said beam, whereby a relatively wideband output is obtained at relatively high efficiencies and with at least moderate power levels, said coupled cavity extended interaction resonator having a conically-shaped upstream end wall structure reentrantly projecting into said extended interaction resonator, whereby said extended interaction resonator has a relatively favorable form factor to provide a relatively high interaction impedance commensurate with providing a relatively short spacing between the center of said extended interaction resonator and the interaction gap of the penultimate resonator for enhanced output efficiency.

2. The apparatus of claim 1 wherein said distributed field buncher resonators are topologically equivalent helix structures provided with wave reflective discontinuities at their ends to form resonant structures.

3. The apparatus of claim 1 wherein said coupled cavity extended interaction resonator comprises at least two coupled cavities having at least two interaction gaps for successive interaction with the beam passable therethrough.

4. The apparatus of claim 1 including means forming a plurality of electrostatic lenses successively disposed along the beam path for electrostatically focusing the beam, and wherein an electrostatic beam focusing lens structure is disposed within said conically-shaped end wall portion of said extended interaction resonator.

5. The apparatus of claim 1 wherein said extended interaction resonator is dimensioned for resonance at the lowest frequency $\pi$ mode of operation with the beam, whereby enhanced efficiency is obtained.

6. The apparatus of claim 1 wherein said buncher resonators include, a conductive helix structure, a conductive structure surrounding said helix, and a plurality of dielectric support rods axially extending of said helix structure, spaced around the periphery of said helix structure and supporting said helix structure from said surrounding conductive structure.

7. The apparatus of claim 6 including a pair of conductive leg structures shorting said helix structure at its ends to said surrounding conductive structure.

8. The apparatus of claim 1 wherein said extended interaction resonator has a conically-shaped downstream end wall structure reentrantly projecting into said extended interaction resonator, and means forming a suppressor electrode structure disposed within said downstream conical end wall structure to prevent electrons emanating from said beam collector structure from passing into said extended interaction resonator.

References Cited

UNITED STATES PATENTS

| | | | |
|---|---|---|---|
| 2,647,219 | 7/1963 | Touraton et al. | 315—5.39 X |
| 2,860,280 | 11/1958 | McArthur | 315—3.6 X |
| 2,945,155 | 7/1960 | Chodorow | 315—5.39 |
| 3,192,430 | 6/1965 | Chodorow | 315—5.39 X |
| 3,270,240 | 8/1966 | Lavoo | 315—5.39 X |
| 3,375,397 | 3/1968 | Leidigh | 315—5.51 X |

OTHER REFERENCES

The Future of Extended Interaction Klystrons by Preist, Eitel, McCullough, Inc., San Carlos, California, Exetrait des Travaux du 5° Congres International Tubes Pour Hyperfrequences Paris, France, 1964.

HERMAN KARL SAALBACH, Primary Examiner

S. CHATMON, Jr., Assistant Examiner

U.S. Cl. X.R.

315—5.46, 5.51, 5.52; 333—83